United States Patent [19]

Haghiri-Therani et al.

[11] Patent Number: 4,536,013

[45] Date of Patent: Aug. 20, 1985

[54] MULTILAYERED INDENTIFICATION CARD

[75] Inventors: Yaya Haghiri-Therani; Wolfgang Gauch, both of Munich, Fed. Rep. of Germany

[73] Assignee: GAO Gesellschaft fur Automation und Organisation, Munich, Fed. Rep. of Germany

[21] Appl. No.: 474,418

[22] Filed: Mar. 11, 1983

Related U.S. Application Data

[63] Continuation of Ser. No. 177,043, Aug. 11, 1980, abandoned.

[30] Foreign Application Priority Data

Aug. 17, 1979 [DE] Fed. Rep. of Germany ....... 2933436

[51] Int. Cl.³ ........................ B42D 15/00; G09C 3/00

[52] U.S. Cl. ........................................ 283/77; 283/82; 283/112; 283/113; 283/904

[58] Field of Search ................ 283/112, 904, 111, 74, 283/75, 76, 77, 78, 94, 107, 108, 109, 110, 113, 114, 82

[56] References Cited

U.S. PATENT DOCUMENTS

| | | | |
|---|---|---|---|
| 1,457,805 | 6/1923 | Woodhull | 283/112 X |
| 2,384,667 | 9/1945 | Dowd | 283/112 X |
| 3,152,901 | 10/1964 | Johnson | 283/112 X |
| 3,158,523 | 11/1964 | Morrow | 283/112 X |
| 3,461,581 | 8/1969 | Hoffman | 40/2.2 |
| 3,533,176 | 10/1970 | Weitzberg et al. | 283/112 X |
| 3,571,957 | 3/1971 | Cumming et al. | 283/112 X |
| 3,732,640 | 5/1973 | Changnon . | |
| 3,921,318 | 11/1975 | Calavetta | 283/112 X |
| 3,967,400 | 7/1976 | Otto | 40/2.2 |
| 4,006,050 | 2/1977 | Hurst et al. | 283/112 X |
| 4,092,449 | 5/1978 | Bernstein . | |

FOREIGN PATENT DOCUMENTS

| | | |
|---|---|---|
| 2163943 | 7/1972 | Fed. Rep. of Gérmany . |
| 2262507 | 6/1973 | Fed. Rep. of Germany . |

*Primary Examiner*—Paul A. Bell
*Attorney, Agent, or Firm*—Neuman, Williams, Anderson & Olson

[57] ABSTRACT

A multilayered data carrier, in particular an identification card, consisting of at least one data carrier with non-user and user data, in particular with a phonograph of the authorized user, in the case of which the user data, i.e. the user's photograph, are protected by a transparent cover sheet which is glued or welded onto the card. The data carrier has a high-security printed pattern, e.g. a guilloche pattern, and the user data are copied onto the data carrier by means of an electro-photographic method, i.e. by xerography or by zinc oxide-electrophotography.

3 Claims, 3 Drawing Figures

MULTILAYERED INDENTIFICATION CARD

Figure 2:
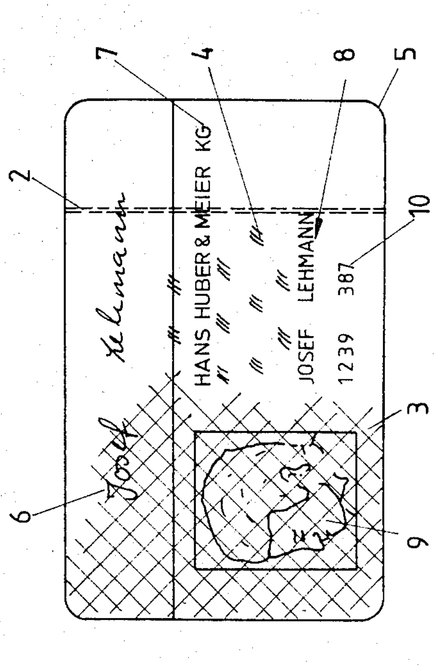

This a continuation of application Ser. No. 177,043 filed Aug. 11, 1980, now abandoned, the text of which is hereby incorporated by reference.

This invention concerns a multi-layer data carrier, in particular an identification card, consisting of at least one data carrier on which non-user and user data, more specifically a photograph of the authorised user, are provided and having at least one transparent cover sheet which is glued or welded onto the front side of the data carrier bearing the data. The invention also concerns a method for manufacturing such a data carrier.

The use of identification cards, credit cards, purchase cards etc. is constantly increasing. Apart from general data, such data carriers also bear user data which permit the authorised user of such a data carrier to be identified. In this respect a photograph of the user is a commonly used identifying mark. In order to render data carriers insusceptible to forgery, particular measures must be taken to ensure that the photograph is undetachably combined with the carrier.

U.S. Pat. No. 3,533,176 describes an identification card with paper inlet which is coated with a photographic emulsion. A picture of the user and the necessary data are applied to the photographic layer by appropriate exposure and the photographic layer can be protected by a transparent cover sheet.

For manufacturing such an identification card special papers are necessary which require expensive storage and which are complicated in handling because these papers must be protected against light and stored in a darkroom. Expensive special devices are required for applying the data and the picture and these cannot be used for other purposes and are as a result unprofitable for small series and for user-companies requiring only small series. The degree of security of this known identification card is not particularly high since a close connection between the cover sheet and the paper inlet is prevented due to the emulsion layer so that delamination is possible. For experts, total counterfeits are relatively easy to make since the technology used can easily be reproduced for individual cards in a photographic laboratory.

U.S. Pat. No. 3,732,640 also describes an identification card in the case of which the picture of the user is produced by a lithographic method on a photosensitive layer applied to a carrier, so that the usual photographic development is not required. In the embodiment example described, the exposure is carried out by means of ultraviolet light so that the paper and suspension layer are insensitive to daylight. The numerous stages of the method and the expensive devices required are a disadvantage because they are acceptable only in the case of a large series, while being unprofitable for small series. Total counterfeits are relatively simple to produce since the technology used is generally available and the carrier cannot be particularly safeguarded. The provision of background patterns poses problems.

The manufacturing costs for such identification cards can be reduced if an exposed film sheet is directly combined with or laminated to an inscribed plastic sheet. Such an identification card is known from U.S. Pat. No. 3,152,901. In the case of this solution the manufacture of the film sheet, however, also requires phototechnical measures, such as darkroom work. The degree of security of the identification card is reduced due to the fact that a paper inlet provided with identifying marks is not provided. Total counterfeits can be made relatively simply since the corresponding technology is easily available.

German AS-print No. 2,163,943 also describes an identification card in which an exposed photo-conductive layer dusted with a colour powder is laminated as a data carrier directly into the identification card. The data, including a picture of the user, are first of all produced as a latent charge pattern on the photo-conductive layer and are then made visible by means of a colour powder (toner) and this picture is then fixed by pasting a sheet over it.

Due to the extremity complicated arrangement of the card (including up to 7 layers) and the complicated special devices required for manufacturing the identification card, this known method is not suitable for manufacturing low-cost cards in small series which are adapted to individual user requirements. The high technological expenditure of the method practically requires central manufacturing. The presence of various layers, e.g. photo-semiconductor, metallic barrier layer etc., encourages manipulation of the card, for example by means of splitting or delamination. Moreover, this laminated card will probably not be resistant to wear when in use.

Although the security value of the known identification cards is completely sufficient for various purposes of application, such as company identification cards, club cards etc., the expensive manufacturing methods and means only permit centralised manufacturing. Decentralised manufacturing of small series at the place where they are required and supplementary manufacture of individual cards is not possible due to the special devices required and the number of manufacturing stages of the method. Basically, total counterfeits are possible for an expert by using generally widespread techniques.

The degree of security of all the known identification cards is determined by the method of applying the data. This method, which is necessarily complicated, permits no changes and no adaptation to certain user requirements.

It is therefore the object of the invention to provide an identification card which, on the one hand, has a high degree of security but which, on the other hand, can be individually adapted to certain user requirements.

In accordance with the invention this object is solved by the features stated in the characterising portion of the main claim. This invention proceeds from the knowledge that the level of security of an identification card is enhanced by means of a neutral data carrier manufactured in series, e.g. a security paper provided with a watermark, security thread, guilloche background or steel photogravure, and that the personalisation of the data carrier can be effected almost anywhere by means of ordinary commercial photocopying and laminating devices. The invention thus provides for separation of the security and user requirement aspects of identification cards.

Advantageous further developments of the invention are the subject matter of the subclaims.

Figure 1:
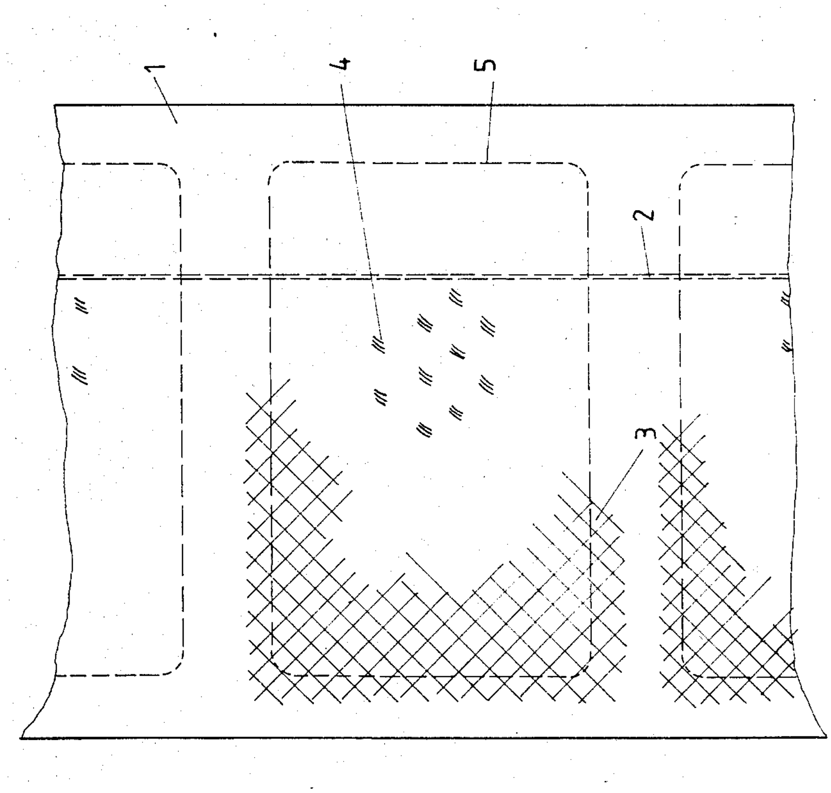
Figure 3:
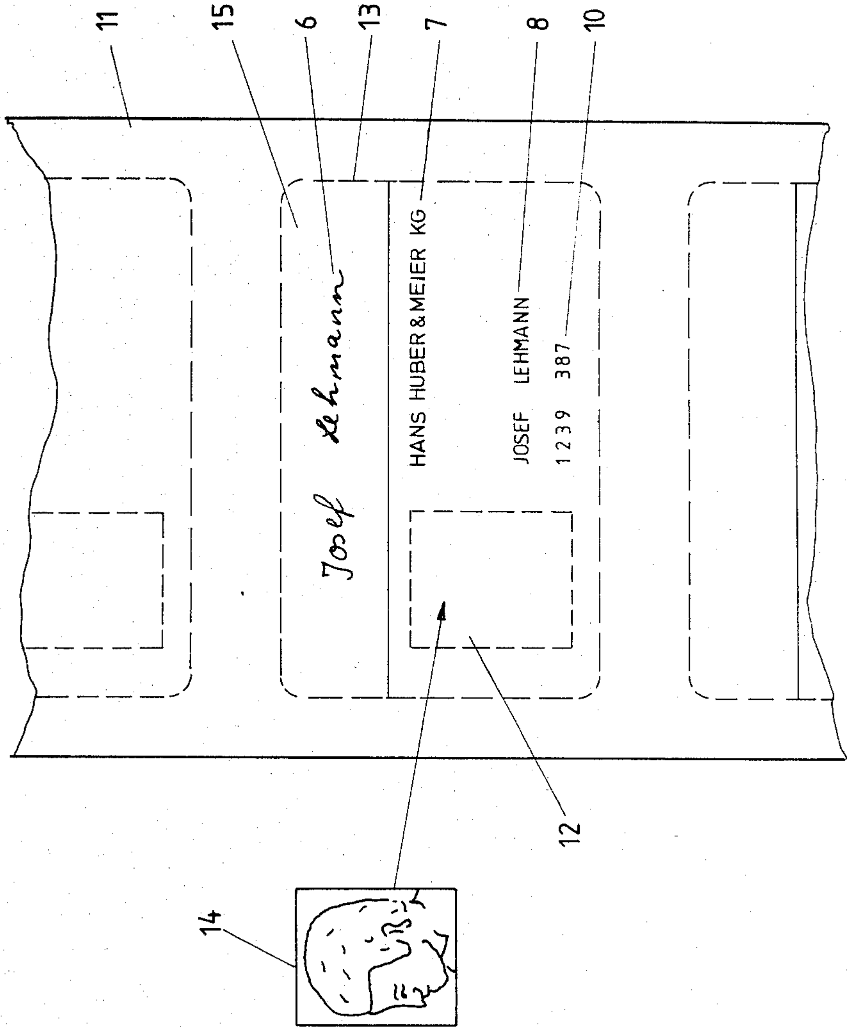

The invention will now be described in more detail by means of an embodiment example with reference to the drawing, in which:

FIG. 1 shows a neutral sheet of security paper serving as a data carrier with punched lines for the identification card which are indicated by means of broken lines, FIG. 2 shows a finished identification card, and FIG. 3 shows an artwork with user data which are transferred in a copying operation to the data carrier.

The security paper 1 shown schematically in FIG. 1 is provided with a security thread 2 at a watermark 4 and a background print 3, e.g. a guilloche photogravure print. Relatively large amounts of such security paper can be manufactured in specialised paper mills in accordance with methods usual in the trade. The security paper used is the same for all identification cards so that cost per unit card can be kept low due to the resulting large quantities produced. Considering the security measures which are usual in the manufacture of security paper, the manufacture of the paper ensures a high level of security against theft.

The printing of the security paper with certain standard background patterns, of which only a few different types are required, and with high-quality security printing is carried out in a security paper printing works specialised in this field. Due to the high quantities produced, this demanding background pattern only slightly increases the costs per unit card.

Thus the security paper 1 is a semi-finished product which is produced with relatively high technical expenditure but in the case of which the cost per unit card is acceptable because it is neutral in respect of its use and can thus be produced in large quantities. A high level of security against theft is guaranteed by the fact that it is centrally manufactured.

In view of its subsequent use in an ordinary commercial copying device, the security paper 1 is preferably manufactured in the format DIN A4. A multiple of identification cards, the format of which can be selected as desired, can be punched out of such a sheet. The broken line 5 indicates the subsequent punched line.

FIG. 3 shows an artwork in the form of a mask 11 which serves for personalising the card blanks. The format of the mask corresponds preferably to that of the sheet 1 and, coinciding with the sheet 1, it has the same efficiency of utilisation. In practical application, this mask is embodied as a form sheet onto which the data of the card user can be inscribed either with a typewriter or by hand.

The mask has a portion 12 which can be used for gluing on photograph 14 of the card user. It further includes a portion 15 for the signature 6 of the user, as well as further portions 7, 8 and 10 for the company title and other information for identifying the card user.

Some of the user data, e.g. company title, company mark etc., may also be copied by means of a further sheet mask so that printing onto the mask 11 can be omitted. Certain partial series within a complete series can be designed so as to be similar in respect of certain information by means of such further masks. Examples of this are divisions, branches or parts of a company.

The masks 11 can be manufactured by the offset printing process in any desired quantity, in all kinds of variations and at the same time at low cost, so that the appearance of the finished identification card can be changed almost in any manner desired despite the fact that only a small number of blank types are used.

The manufacture of the identification cards is carried out such that the sheet of security paper 1 is inserted by the customer into the paper magazine of his copying apparatus. The artwork or mask 11 is placed on the copying window of the device and all data including the picture 14 are transferred to the sheet 1 by means of a conventional copying operation.

Immediately after this copying operation the personalised blanks are laminated with a transparent cover sheet, either centrally by the card manufacturer or decentrally (in individual card laminating devices) by the user. If lamination is not carried out in multipurpose sheets, the cards must be punched out before being laminated. Otherwise punching out is carried out after lamination.

Since ordinary commercial copying devices do not change the surface of the paper with respect to lamination technology (no emulsion layer), the cover sheet is extremely well combined with the data carrier and the colour powder or toner. All manipulation of the finished and laminated identification card can be practically excluded, such as for instance all attempts to remove the picture 9 (FIG. 2) copied onto the card blank.

The only danger of forgery is that original blanks which are neutral in respect of the user could be personalised without authorisation; this, however, can be avoided if the user-company takes appropriate precautionary measures when storing card blanks. Total counterfeiting of the paper blanks which are high-security printed is not possible either.

Multi-coloured copying devices may naturally also be used instead of the ordinary commercial black-and-white devices.

Moreover it will be obvious that the gist of the invention can be applied not only to identification cards but quite generally to all other documents and papers requiring security precautions, e.g. securities, shares etc. The method is always particularly advantageous if, on the one hand, measures must be taken to ensure that documents and data cannot be forged nor counterfeited and if, on the other hand, the individual data are to be applied using relatively simple means.

What we claim is:

1. A multilayered identification card for use by an authorized user comprising a security paper having one or more security features incorporated therein; said security paper also having printed thereon a high quality printed security pattern, said security features and said security pattern affording protection against unauthorized reproduction of said security paper; first data relating broadly to the class of users of said identification card disposed on said identification card; second data specific to the authorized user of said identification card for assuring user identification incorporated in said identification card; at least said second data comprising an electrophotographically reproduced toner picture directly applied to a surface of said security paper so that the security pattern is located between the security paper and the toner picture in overlapping relation, and at least one transparent cover film secured to the security paper surface having said picture thereon.

2. The identification card of claim 1 in which said security feature is a water mark and can be identified visually.

3. The identification card of claim 1 in which said security feature is a security thread and can be identified visually or mechanically.

* * * * *